Patented Feb. 26, 1952

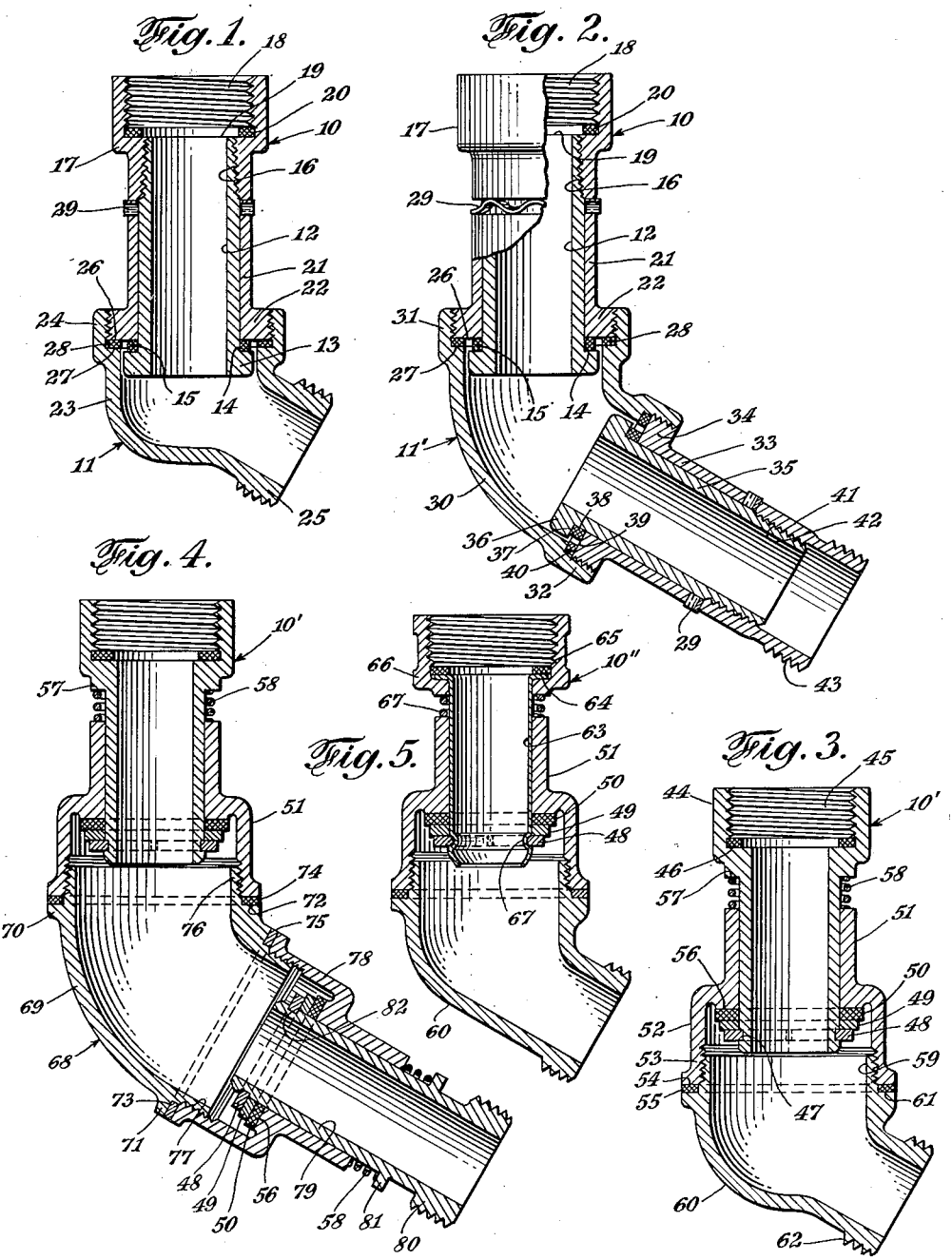

2,587,170

UNITED STATES PATENT OFFICE 2,587,170

SWIVEL JOINT

Charles Klingler, Amityville, and Ernest F. Klingler, Lindenhurst, N. Y.

Application May 19, 1949, Serial No. 94,106

1 Claim. (Cl. 285—97.6)

The present invention relates generally to pipe fittings, and particularly to a swivel joined or an articulated connecting unit especially designed to be interposed between an existing faucet and a garden hose, and has for its prime purpose to provide an unrestricted movement of a garden hose at any desired angle in respect to the faucet so as to prevent kinking or twisting of the hose, the device being further designed to readily facilitate unraveling and untwisting of a kinked garden hose while associated with a faucet.

One of the prime objects of the present invention is to provide a simple, inexpensive and efficient hose connecting unit adapted for association with an existing water faucet, and which comprises a faucet-engaging member and a hose-engageable member revolvable in respect to said faucet-engaging member.

Another important object of this invention is the provision of a hose-connecting unit comprising a faucet-engaging member provided with a washer seat for accommodating and holding a washer, and a hose-engageable member having a corresponding washer seat, and tension means between the faucet-engaging member and hose-engageable member for urging a washer held by the washer seat of the faucet-engaging member against a washer seat provided in the hose-engageable member.

A more specific object of the present invention is the provision of a hose-connecting unit which is composed of a substantially tubular faucet-engaging member having means at its interior end for supporting a washer, and a hose-engageable member comprising a sleeve element rotatably mounted about the faucet-engaging member and an angularly hollow body removably associated with said sleeve element and provided with means for facilitating attachment thereto of a hose, and wherein a washer is placed between the interior or lower end of the sleeve element and the interior or lower end of the faucet-engaging member, and wherein a tension element is interposed between the outer or upper end of the faucet-engaging member and the outer or upper end of the sleeve element for urging said washer against the interior or lower end of the latter element.

A still further specific object of this invention is to provide a hose-connecting unit composed broadly of a faucet-engaging member and a hose-engageable member, and wherein the former member is recessed at its extreme interior end for the reception of a spring ring, which latter is adapted to support a solid ring which in turn serves as support and seat for a washer, and wherein the hose-engageable member is composed of a sleeve element, to the lower end of which is attached one end of a curved, hollow body and which sleeve element is provided with a washer seat opposite said solid ring, and wherein a washer is interposed between said ring and that seat of the sleeve element, and wherein a spring is interposed between the upper end of the sleeve element and the upper end of the faucet-engaging member to urge the washer against the seat of the sleeve element, and wherein at the other end of the curved body is removably secured another sleeve element in which is rotatably mounted a tubular member, similar in construction to said faucet-engaging member, but having at its outer end a male thread for engaging a fitting or a garden hose, and wherein again a washer under spring tension is interposed between the end of the hose-engaging member and the corresponding end of the sleeve element.

The foregoing and numerous other objects and important advantages of the present invention will become more fully apparent from the ensuing description in conjunction with the accompanying drawings, wherein several of the presently preferred forms of the invention are more or less diagrammatically illustrated. In these drawings:

Fig. 1 is a vertical cross section through one form of the device;

Fig. 2 is a substantially vertical cross section of a modified form of the device with a doubly rotatable hose-engageable member;

Fig. 3 is a vertical section through a device similar to that shown in Fig. 1 but disclosing a one-piece faucet-engaging member and a modified form of a washer support;

Fig. 4 is a vertical section through a device similar to that shown in Fig. 2 with modifications similar to those disclosed in Fig. 3; and Fig. 5 is a vertical section of still another modified form of a device similar to that shown in Fig. 1.

In the following detail description of the drawings, numerals 10, 10' and 10'' indicate different types of faucet-engaging members. The hose-engageable members will be designated as the description of each of the figures progresses. In Fig. 1 the hose-engageable member is indicated at 11. Each of the faucet-engaging members 10 in Figs. 1 and 2 comprise a tubular structure 12 provided at its interior or lower end with an annular enlargement or flange 13 having a washer seat 14, supporting a relatively narrow washer 15. The upper end of tubular structure 12 is threaded at 16, and engaging that threaded end is bushing 17 provided with a female thread 18 for accommodating the threaded end of an existing faucet. At the bottom end of the thread 18 is a seat 19 for the reception of a gasket 20.

Hose-engageable member 11 is composed of two detachable portions, a sleeve element 21 having a broadened, externally threaded end or flange 22, and a hollow angular body 23. The enlarged, internally threaded upper end 24 of the body is removably secured to the threaded flange 22 of element 21, and lower body end 25 is threaded for connection with a hose fitting. Flange 22 of sleeve element 21 has a combination gasket and washer seat 26, and at the bottom end of the thread within body enlargement 24 is a gasket seat 27. Between combination seat 26 of sleeve element 21 and the gasket seat 27 of body 23 is placed a relatively broad gasket 28, adjacent to and concentric with washer 15. Between the upper or outer end of sleeve element 21 and the lower end of bushing 17 is interposed a tension spring 29 for forcibly urging flange 13 of tubular structure 12, and thus washer 15, against flange 22 of sleeve element 21.

In Fig. 2 the description and the designations of parts of the faucet-engaging member correspond to that disclosed in Fig. 1. Also sleeve element 21 of Fig. 2 is structurally identical with that illustrated in Fig. 1. However, the faucet-engageable member 11' is of a different construction from member 11 of Fig. 1, and comprises an elbow fitting 30 with enlarged upper and lower internally threaded ends 31 and 32. Upper end 31 corresponds to upper end 24 of Fig. 1, but the lower end 32 is designed for engagement with a sleeve element 33, similar to sleeve element 21, its threaded flange or enlargement 34 engaging the internal thread of elbow enlargement 32. Within sleeve 33 is revolubly mounted tubular member 35 having an interior end flange 36, provided with a washer seat 37 for accommodating and supporting a washer 38. Flange 34 of sleeve 33 has a combination washer and gasket seat 39 for accommodating both washer 38 and gasket 40. Secured to the threaded end 41 of tubular member 35 is an internally threaded bushing 42 provided with an external thread 43 for engagement with a hose fitting. Interposed between bushing 41 and the outer end of sleeve 33 is a spring element 29 similar in structure and function to that shown in the upper portions of Figs. 1 and 2.

In both above described embodiments, sleeves 21 are rotatable about tubular members 12, gaskets 28 form water-tight, fixed connections between sleeves 21 and the upper ends of elbow bodies 23 and 30, and washers 14 are held under tension by spring elements 29 so that they provide water-tight, but movable connections between tubular members 12 and sleeves 21. Both in Figs. 1 and 2 it will be observed that gasket 29 is disposed externally to and is spaced from washer 15, both washer and gasket being in concentric relation to one another. In Fig. 2 the lower end of elbow body 30 is also connected in a water-tight, fixed manner with sleeve 33 by means of gasket 40. Washer 38 provides a water-tight but movable connection between sleeve 33 and tubular member 35 as it is forced by flange 36 against the seat of flange 34 through spring 29 at any position of tubular member 35 in respect to sleeve 33.

From the above description of Fig. 2 it will be readily evident that that construction facilitates a double rotary movement, first, of sleeve 21 with elbow body 30 about tubular member 12, and, second, of the hose-engageable, member composed of tube 35 and bushing 41, within sleeve 33.

In practice the faucet-engaging member is tightly connected to an existing faucet. The latter is usually inclined at a thirty degree angle from the horizontal plane. For this reason the body of the hose-engageable member is preferably curved sixty degrees, thus causing its lower end to normally assume a vertical position when weighted down by an attached hose.

Operation

When the hose-connecting unit of the type indicated is attached to a water faucet and a garden hose is secured to its hose-engageable member, the bottom edge of the latter will be disposed in substantially a horizontal plane and the hose will normally depend vertically from the unit. Any movement of the hose end from its normal vertical position is facilitated by the ready rotation of hose-engageable members 11 or 11' about faucet-engaging members 10.

To state a concrete example, assume that watering by a garden hose is to take place in a glass house wherein plants are usually placed in trays supported by rows of racks spaced by narrow alleys. The limited space between the racks greatly restricts the movement of the garden hose. When a hose-connecting unit, such as shown in Fig. 1, is employed, say at the center or at any other point of the alley, the hose connected with the unit may be turned within a limited arc without becoming twisted or kinked. Where a very long hose is to be employed for watering plants in different sections of a glass house, it is preferred to use a hose-connecting unit such as shown in Fig. 2. That modified structure facilitates the movement of an attached hose not only in an arc, but also allows complete and repeated turning of the hose through 360 degrees in any direction so that it may be used around corners and in any required position without subjecting it to twisting or kinking. Moreover, the structure in Fig. 2 readily facilitates untwisting and unkinking of a coiled hose by the simple expedience of a simple pulling action, without causing a break or other damage to the hose.

Modifications

Figs. 3 and 5 illustrate simplified devices similar to that shown in Fig. 1. Faucet-engaging member 10' of Fig. 3 is a one-piece tubular structure provided at its upper enlarged end 44 with a female thread 45 for engagement with a water faucet. At the bottom end of the thread 45 is a seat for gasket 46, which latter provides a water-tight, fixed connection with a faucet. At the interior or lower end of member 10' is a recess 47 for the reception of a split spring ring 48, supporting a full-bodied ring 49 which serves as a seat for a washer 50. Revolubly associated with member 10' is a sleeve 51, enlarged at its lower end 52, which latter is threaded internally at 53. Its extreme end is provided with a gasket seat 54 for engagement with a fixed gasket 55. At the interior of enlargement 52 there is provided a washer seat 56 for washer 50.

Enlarged end 44 of member 10' is offset at 57, and between that offset end and the upper end of sleeve 51 is interposed a spring element 58 adapted to urge washer 50 against seat 56 within enlargement 52 of sleeve member 51. Engaging the internal threads 53 of the sleeve member is the externally threaded end 59 of a hose-engageable member 60, the latter being provided with a gasket seat 61 opposite gasket seat 54 of the sleeve member. The lower end of hose-engageable member 60 is threaded externally at 62 for engagement with a hose fitting.

In Fig. 5 the faucet-engaging member comprises a relatively slim-walled, drawn tubular structure 63 provided with a flange 54, the latter serving as a seat for a gasket 65 and is engaged at its lower face by the internal flange of threaded bushing 66 which is rotatable about tubular structure 63. Bushing 66 is adapted for engagement with an existing water faucet. The interior or loewr end of tubular structure 63 is provided with an annular recess 67 for the accommodation of a split spring ring 48, supporting a solid ring 49, which latter in turn supports and forms a seat for a washer 50, all of which ring elements are identical with those shown in Fig. 3. There is also employed in this construction a sleeve member 51 and a hose-engageable member 60, both being substantially identical with the corresponding members of Fig. 3. Between sleeve member 51 and bushing 66 there is again employed a spring element denoted at 67 which is similar to spring element 58 of Fig. 3.

Fig. 4 illustrates a companion structure to that of Fig. 2. The upper faucet-engaging portion 10' is identical with that of Fig. 3 but the hose engageable member generally denoted at 68 differs somewhat from the arrangement shown in Fig. 2. This hose-engageable member comprises an elbow structure 69 with end enlargements 70 and 71 at which are formed seats 72 and 73 for accommodating gaskets 74 and 75. The extreme ends of elbow 69 are threaded at 76 and 77. With the lower thread 77 is associated a sleeve member 78, corresponding in shape to the upper sleeve member 51. Within sleeve 78 is revolubly lodged a one-piece tubular member 79 provided at its exterior or lower end with a threaded enlargement 80 adapted for association with a hose fitting. Adjacent to enlargement 80 an annular flange 81 is shown, which, however, may be omitted when enlarged end 80 is extended to form an abutment. At the interior or upper end of tubular member 79 there will be seen a recess 82 for the reception of a split ring 48 serving as a backing for a full ring 49, which latter in turn forms a seat for washer 50. Within sleeve 78 there is an offset, faced portion serving as counterseat 56 for washer 50. Between the lower end of sleeve 78 and flange 81 there is again placed an expansion spring 58 adapted to urge rings 48 and 49 and washer 50 toward seat 56 within the sleeve.

The modifications illustrated in Figs. 3, 4 and 5 substantially correspond in their general structural arrangements and their operation to the devices disclosed in Figs. 1 and 2.

An important feature in each of the units shown and described is the provision of spring elements between the tubular members and the sleeves rotatable about them. These spring elements have for their primary function to initially urge the washers held at the interior ends of the rotatable members against the washer seats of the sleeves while the water passing through the units is at a relatively low pressure, as is the case, for instance, when the faucet to which the unit is connected is opened only slightly. In that event the action of the spring elements is depended on to prevent leakage of water. When the faucet is turned on fully, the resulting high water pressure will have the tendency of separating the tubular members from the sleeves, whereby the latter are drawn forcibly against the washers associated with the ends of the tubular members. In that manner a forceful seal between these instrumentalities is effected, and the high pressure of the water takes over and greatly augments the primary function of the spring elements.

Under the heading "Operation" a specific example of using the present device in connection with a garden hose was explained. It is quite obvious, however, that any one of the devices may be readily adapted with slight changes to serve as connecting units between standard pipes or tubing where articulation between the fixed ends of such pipes or tubing is required.

In the drawings a few specific embodiments of the present invention were illustrated for the purpose of facilitating the explanation of the working principle of the device. It is quite obvious that changes in the structural arrangement may be effected to simplify and improve the manufacture of the device, such changes being deemed to reside within the scope of this invention as covered by the annexed claim.

What is claimed as new is:

In a swivel-joint hose-connecting unit, a bushing having enlarged and reduced internally threaded body portions, the enlarged portion serving for removably receiving an existing threaded faucet, a tubular element threaded at one end and in thread-engagement with the reduced bushing portion, the other end of the tubular element forming an annular enlargement having a washer seat, a relatively narrow washer supported by said seat; a sleeve revolubly engaging said tubular element, said sleeve having at one end a relatively broad, externally threaded flange with a wide, flat outer face, its other end extending toward said reduced body portion of said bushing, a spring element interposed between that latter bushing portion and that other sleeve and for forcibly urging said wide flange face against said narrow washer; a hollow angular body having an enlarged, internally threaded upper end and a lower end provided with an external thread for accommodating a hose fitting, said enlarged upper end of the angular body having a gasket seat at the bottom of its thread, a relatively broad gasket carried by said seat externally to, spaced from and concentric with said relatively narrow washer supported by the seat of the annular enlargement, the internal thread of the enlarged end of said angular body removably but tightly engaging the external thread of said sleeve flange, said broad gasket forming a water-tight seal and being forcibly and fixedly held between said wide outer flange face and said enlarged end of the angular body.

CHARLES KLINGLER.
ERNEST F. KLINGLER.

REFERENCES CITED

The following references are of record in the file of this patent:

UNITED STATES PATENTS

| Number | Name | Date |
|---|---|---|
| 324,874 | Morton | Aug. 25, 1885 |
| 457,503 | Ball | Aug. 11, 1891 |
| 671,366 | Brodie | Apr. 2, 1901 |
| 2,082,654 | Reader | June 1, 1937 |
| 2,215,686 | Buchet | Sept. 4, 1940 |
| 2,443,993 | Schenkelberger | June 22, 1948 |